United States Patent [19]

Lee

[11] Patent Number: 5,365,506

[45] Date of Patent: Nov. 15, 1994

[54] LASER DISK PLAYER

[75] Inventor: Chung G. Lee, Suwon, Rep. of Korea

[73] Assignee: SamSung Electronics Co., Ltd., Suwon, Rep. of Korea

[21] Appl. No.: 923,544

[22] Filed: Aug. 3, 1992

[30] Foreign Application Priority Data

Dec. 23, 1991 [KR] Rep. of Korea ................... 91-23948

[51] Int. Cl.$^5$ .......................................... G11B 33/02
[52] U.S. Cl. .................... 369/75.2; 369/77.1
[58] Field of Search .................. 369/75.1, 75.2, 77.1, 369/77.2, 244–249; 360/99.02, 99.03, 99.06, 99.07

[56] References Cited

U.S. PATENT DOCUMENTS

| | | | |
|---|---|---|---|
| 4,628,498 | 12/1986 | Takamatsu | 369/77.1 |
| 4,701,901 | 10/1987 | Imai | 369/75.2 |
| 4,755,978 | 7/1988 | Takizawa | 369/75.2 |
| 4,773,056 | 9/1988 | Ito | 369/75.2 |
| 4,773,057 | 9/1988 | Otsuka et al. | 369/75.2 |
| 4,890,276 | 12/1989 | Ono et al. | 369/77.2 |
| 5,081,618 | 1/1992 | Abe | 369/244 |
| 5,084,854 | 1/1992 | Ikedo et al. | 369/75.1 |
| 5,097,465 | 3/1992 | Funabashi | 369/75.2 |
| 5,119,357 | 6/1992 | Tsuruta et al. | 369/75.2 |
| 5,123,005 | 6/1992 | Kudosu | 369/75.2 |
| 5,172,361 | 12/1992 | Urushibata et al. | 369/77.1 |
| 5,184,342 | 2/1993 | Ishii | 369/77.1 |
| 5,195,078 | 3/1993 | Ikedo | 369/75.1 |
| 5,204,850 | 4/1993 | Obata | 369/75.2 |

FOREIGN PATENT DOCUMENTS 0261384 3/1988 European Pat. Off. .
0380238 8/1990 European Pat. Off. .
0400949 12/1990 European Pat. Off. .

OTHER PUBLICATIONS

Patent Abstracts of Japan, vol. 17, No. 87 (p–1491) 22 Feb. 1993 & JP–A–42 086 761 (Sony Corp.) 12 Oct. 1992.

Patent Abstracts of Japan, vol. 13, No. 131 (p–850), 31 Mar. 1989 & JP–A–63 300 4// (Sony Corp.), 7 Dec. 1988.

Patent Abstracts of Japan, vol. 17, No. 311 (p–1556) 14 Jun. 1993 & JP–A–60 028 611 (Pioneer Electronic Corp.) 6 Feb. 1993.

*Primary Examiner*—Richard A. Bertsch
*Assistant Examiner*—Peter Korytnyk
*Attorney, Agent, or Firm*—Robert E. Bushnell

[57] ABSTRACT

A laser disk player which can sequentially perform the loading and chucking operations of a disk tray and the tilting operation of an optical apparatus by transferring the rotary power of a main motor to a rotary member is disclosed. The laser side player comprises a chucking apparatus mounted at a chassis for performing the loading and chucking operation of a disk tray, a rotary member for sliding the disk tray by rotation of first and second tray gears receiving the rotary power of a main motor, a lever operated in response to the motion of the rotary member for chucking a disk by guiding a bracket tray of the chucking apparatus using a side plate, and a tilt gear mounted on a deck and engaged with the rotary member for tilting an optical apparatus, wherein the management of assembly part is simplified so that the productivity is improved and the production cost is reduced.

46 Claims, 10 Drawing Sheets

LASER DISK PLAYER

BACKGROUND OF THE INVENTION

The present invention relates to laser disk players and, more particularly, to a laser disk player which improves the productivity and reduces the production cost through simplification of each part, by performing the loading and chucking operation of a disk tray and the tilting operation of an optical instrument by the rotation of only a main motor simultaneously.

In general, laser disk players in which an optical pickup projects a laser beam on a disk and detects the reflected beam in order to read out the recorded information, employ a spindle motor for rotating a disk and a feeding motor for moving an optical pickup of an optical apparatus. In the case of horizontal loading laser disk players, especially, a loading motor for sliding the disk tray is also used. The disk is tilted due to deformations such as bending according to operational environments or mechanical chucking state. This makes it difficult to accurately play back information recorded on the disk. Accordingly, in order to keep the distance between the disk and the optical pickup constant, a motor for tilting the optical apparatus is further necessary. Since four motors are employed for performing all functions while playing back the recorded information in the laser disk players, mechanical construction becomes very complicated and the production cost is raised, thereby degrading the productivity and providing many problems in making the laser disk players compact.

Recently, laser disk players employ only three motors to solve these problems. The spindle and feeding motors which are used are identical to the ones used past conventional laser disk players. Then, they use a cam gear instead of a tilting motor so that the optical apparatus is tilted by the loading motor which slides the disk tray. In such conventional laser disk players, however, many screws are used to assemble each part to a case and the structure of the parts mounted on a deck, which are used to transfer the rotary power of the cam gear, becomes complicated, thereby making the overall structure of the laser disk players complicated. Also, since a disk tray for loading the disk and clamps for the chucking operation are separately assembled to the case, a large number of assembly processing steps is required and is difficult to manage, increasing the production cost. Moreover, the size and the shape of the case is restricted, making the fabrication of various products difficult.

SUMMARY OF THE INVENTION

The present invention solves these problems and provides a laser disk player which can perform the loading and chucking operations of a disk tray and the tilting operation of an optical apparatus by transferring the rotary power of a main motor to rotary members and can also simplify the management of assembly parts by easily mounting each part on a chassis and separating each part from the chassis again, and by assembling a chucking apparatus with a deck after completing them in individual processing steps, thereby improving the productivity and reducing the production cost.

Also, the present invention allows making a variety of products since the size and shape of a case can be easily changed.

According to the present invention, a laser disk player is provided for playing back information recorded on a disk by using an optical pickup, comprising a chucking apparatus mounted at a chassis for performing the loading and chucking operation of a disk tray, a rotary member for sliding the disk tray by rotation of first and second tray gears receiving the rotary power of the main motor, a lever operating according to the motion of the rotary member for chucking the disk by guiding the bracket tray of a chucking apparatus using a side plate, and a tilt gear mounted on the deck and engaged with the rotary member for tilting an optical apparatus.

DETAILED DESCRIPTION OF THE PREFERRED EMBODIMENT

The present invention will now be described in more detail with reference to the accompanying drawings.

FIGS. 1 to 4 show each part of a laser disk player according to the present invention.

A chucking apparatus 200 for performing loading and chucking operations of a disk tray 202 is mounted on a chassis 100 and a deck 300 is positioned under the chucking apparatus. On the deck 300, an optical apparatus is mounted for playing back information recorded on a disk 201 using an optical pickup. In the chassis 100, a body consisting of a side frame 101 and a lower frame 102 is formed by injection molding. At the side frame 101, may bar-type guiding slots 103 are formed and, below these guiding slots, guiding pieces 105a and 105b with a slot 104 are formed. At both sides of the side frame 101, a bracket 106 is fixed. Many underpinning pieces 107 are formed at the upper side of the lower frame 102 and bosses 108a and 108b are formed at the center of the lower frame 102. Also, a side plate 10 is inserted into the guiding slot formed at the side frame 101. A plurality of shaped guiding holes 11 are formed in the side plate 10. At the end of the guiding holds 11, an assembly slot 12 is formed and connected to the upper side of the guiding holes 11. Along the border of the guiding holes 11, guiding ribs 13 are also formed. A linking hole 14 is formed at the lower side of the side plate 10.

Figure 7A:
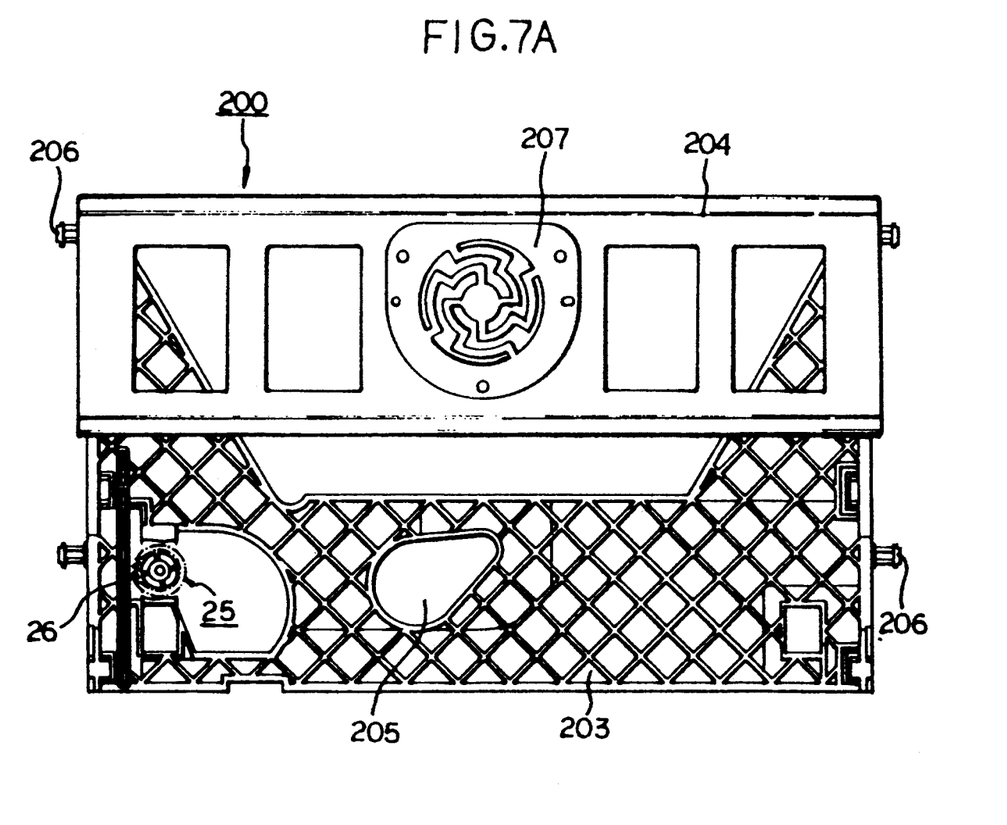
FIGS. 7A and 7B show top and cross-sectional views, respectively, of a chucking apparatus of the laser disk player according to the present invention.
Figure 7B:
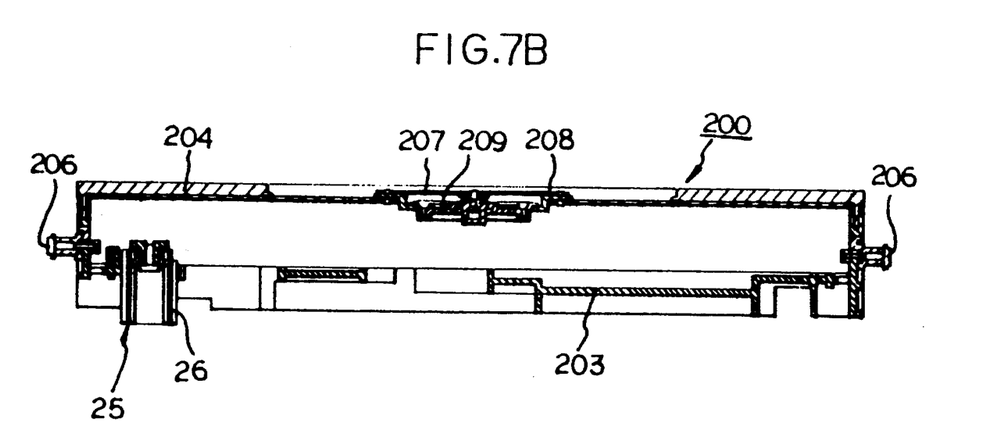

On the other hand, in a chucking apparatus 200, shown in FIGS. 7A and 7B, a disk tray 202, which can load a disk of 80, 120, 200 or 300 mm in diameter, is mounted to a bracket tray 203. A plate 204 is assembled on the bracket tray 203. At both sides of the bracket tray 203, guiding axes 206 are formed. The bracket tray 203 also has a space part 205. The guiding axes 206 are inserted into both the guiding slot 103 of the chassis 100 and the guiding hole 11 of the side plate 10 through the assembly slot 12 of the side plate 10. A spring 207 fixed by a holder 208 is mounted at the center of the plate 204. Also, a clamp 209 is mounted at the holder 208 to press the disk 201.

At this time, since the chucking apparatus 200 can be mounted on the side frame 101 of the chassis 100 after assembling the bracket tray 203 and the plate 204 in individual processes. It is easy to manage assembly parts and thus the efficiency of assembly is improved. At a predetermined portion of the chassis 100 in FIG. 1, a pulley 16 for rotating the rotary member 30 by receiving the rotary power of the main motor 15, and gears 17A and 17B are mounted to be engaged with each other. The rotary power of the rotary member 30 is transferred to the first and second tray gears 20 and 25, the second tray gear 25 being mounted below the bracket tray 203 and engaged with the rack part 202A formed along side of the disk tray 202.

Figure 9A:
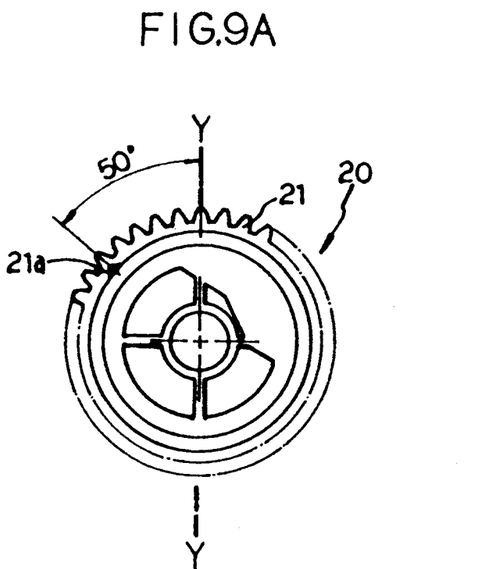
FIGS. 9A and 9B show top and bottom views, respectively, of the first tray gear of the laser disk player according to the present invention.
Figure 9B:
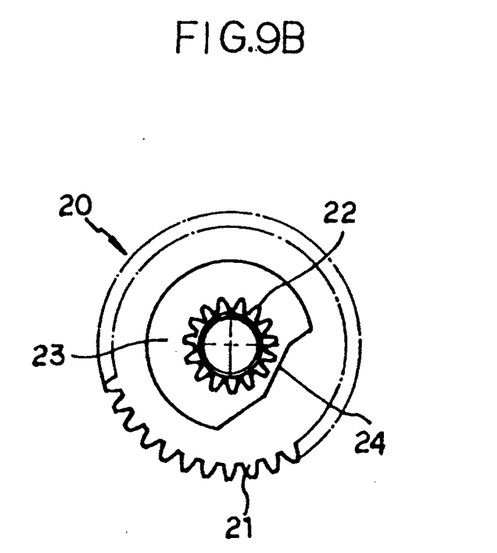

As shown in FIGS. 9A and 9B, first and second gear parts 21 and 22 are formed at the exterior border of the upper and lower parts of the tray gear 20 and a locking face 23 is formed between the upper and lower parts. At a part of the locking face 23, a triangular type of mark 21a is formed at a predetermined part shown in the figures on the left of the first gear part 21 that is apart from Y-Y' axis by an angle of 50°. The second gear part 21 of the first tray gear 20 is engaged with the gear part 26 of the second tray gear 25.

Figure 10A:
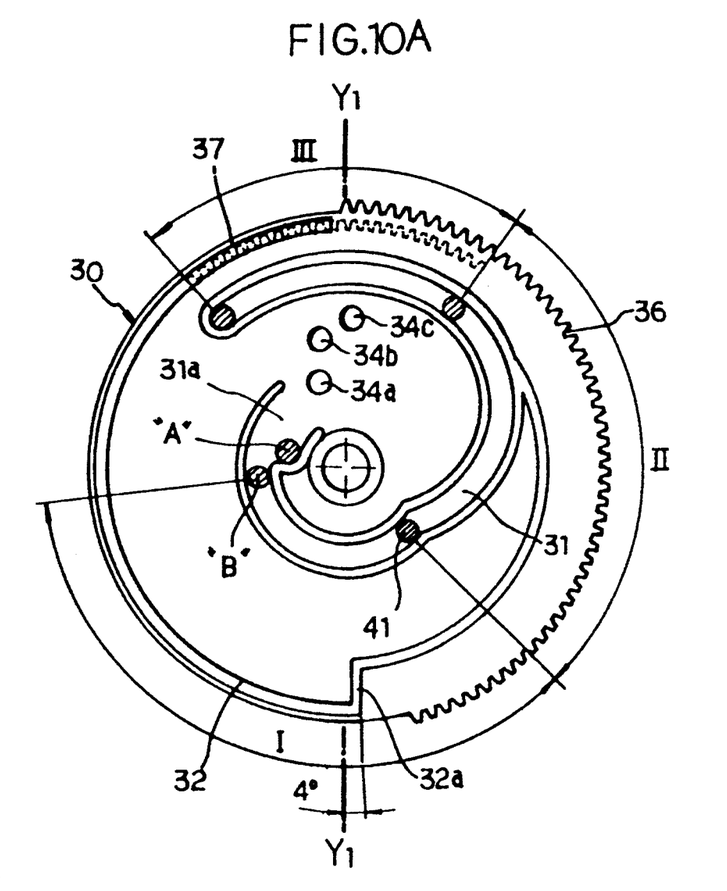
FIGS. 10A, 10B and 10C show top, bottom and cross-sectional views, respectively, of a rotary member of the laser disk player according to the present invention.
Figure 10B:
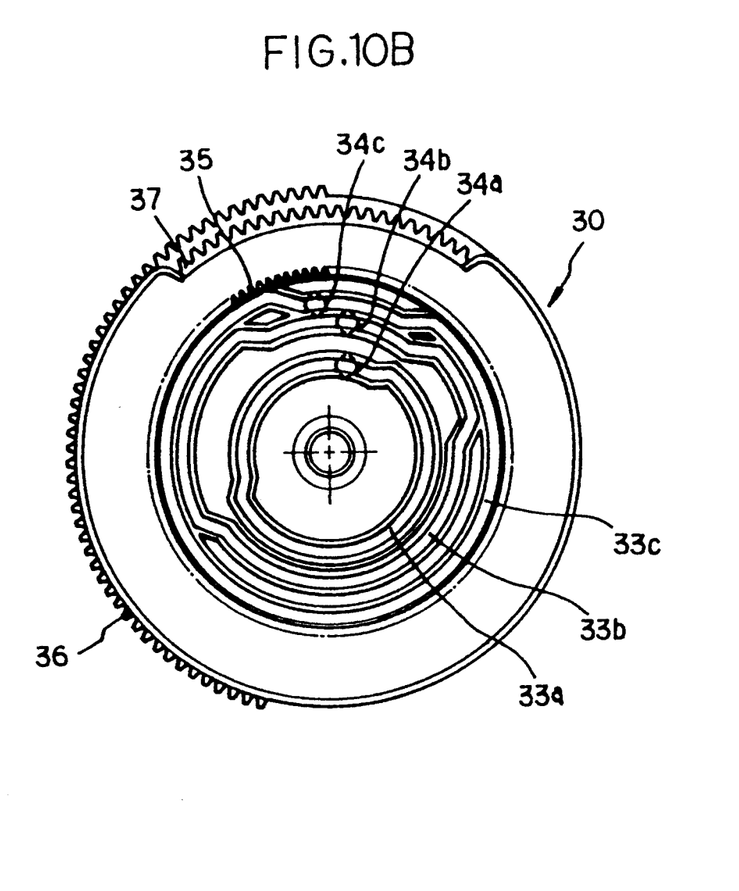
Figure 10C:
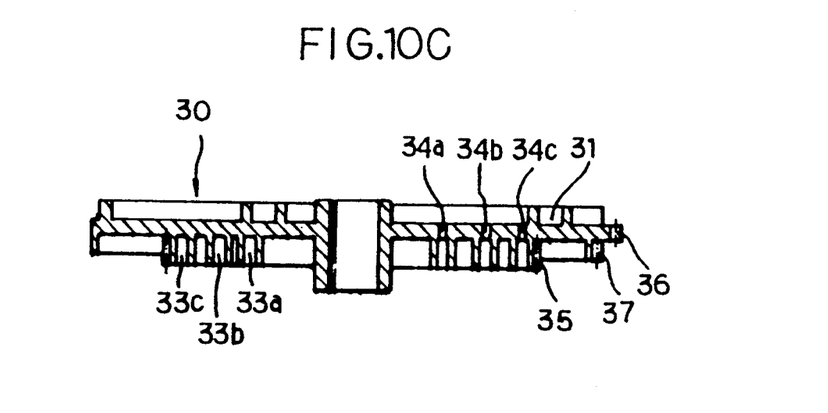

As shown in FIGS. 10A to 10C, a cam slot 31 divided into a moving section I, a chucking section II and a tilting section III, is formed at the upper side of the rotary member 30. At one end of the cam slot 31, a wide space part 31a is formed. A rib 32 with a bending part 32a is formed at a predetermined part of the exterior border of the cam slot 31 with the bending part 32a located apart from Y1-Y1' axis by an angle of about 4°. As shown in FIGS. 10B and 10C, first, second, and third cam slots 33a, 33b, and 33c have assembling holes 34a, 34b, and 34c, respectively, and are formed at the lower side of the rotary member 30. Also, a first gear part 35 is formed at the exterior border of the third cam slot 33c to be engaged with the gear 25b. Subsequently, the second and third gear parts 36 and 37 are formed at the exterior border of the rotary member 30. The second gear part 36 of the rotary member 30 is engaged with the second gear part 22 of the first tray gear 20. The guiding pin 41 of lever 40 is inserted into the cam slot 31.

Figure 11:
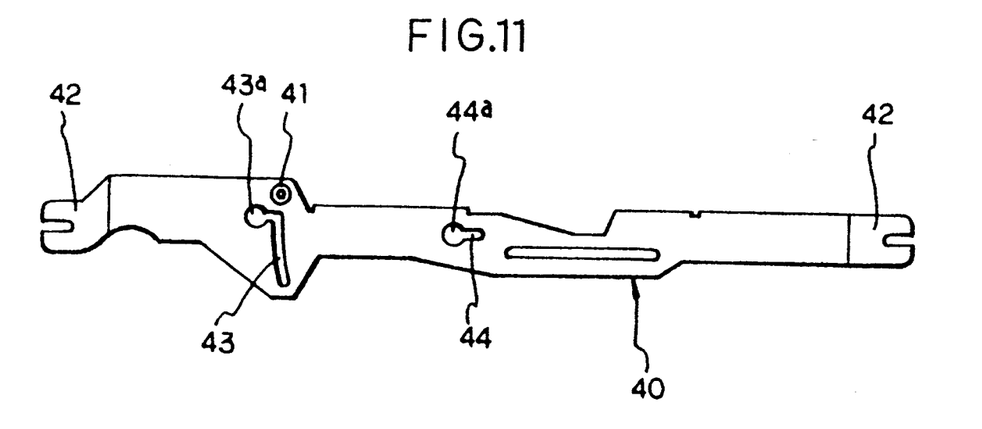
FIG. 11 is a top view of a lever of the laser disk player of the present invention.

As shown in FIG. 11, sliding parts 42 are formed at both ends of the lever 40 so that they are linked with the holes 14 of the side plate 10. Long slots 43 and 44 are formed at the predetermined parts of the lever 40. To these long slots 43 and 44, assembling holes 43a and 44a are connected so that the lever 40 can easily be assembled to or separated from fixing pins 45a and 45b.

Figure 8:
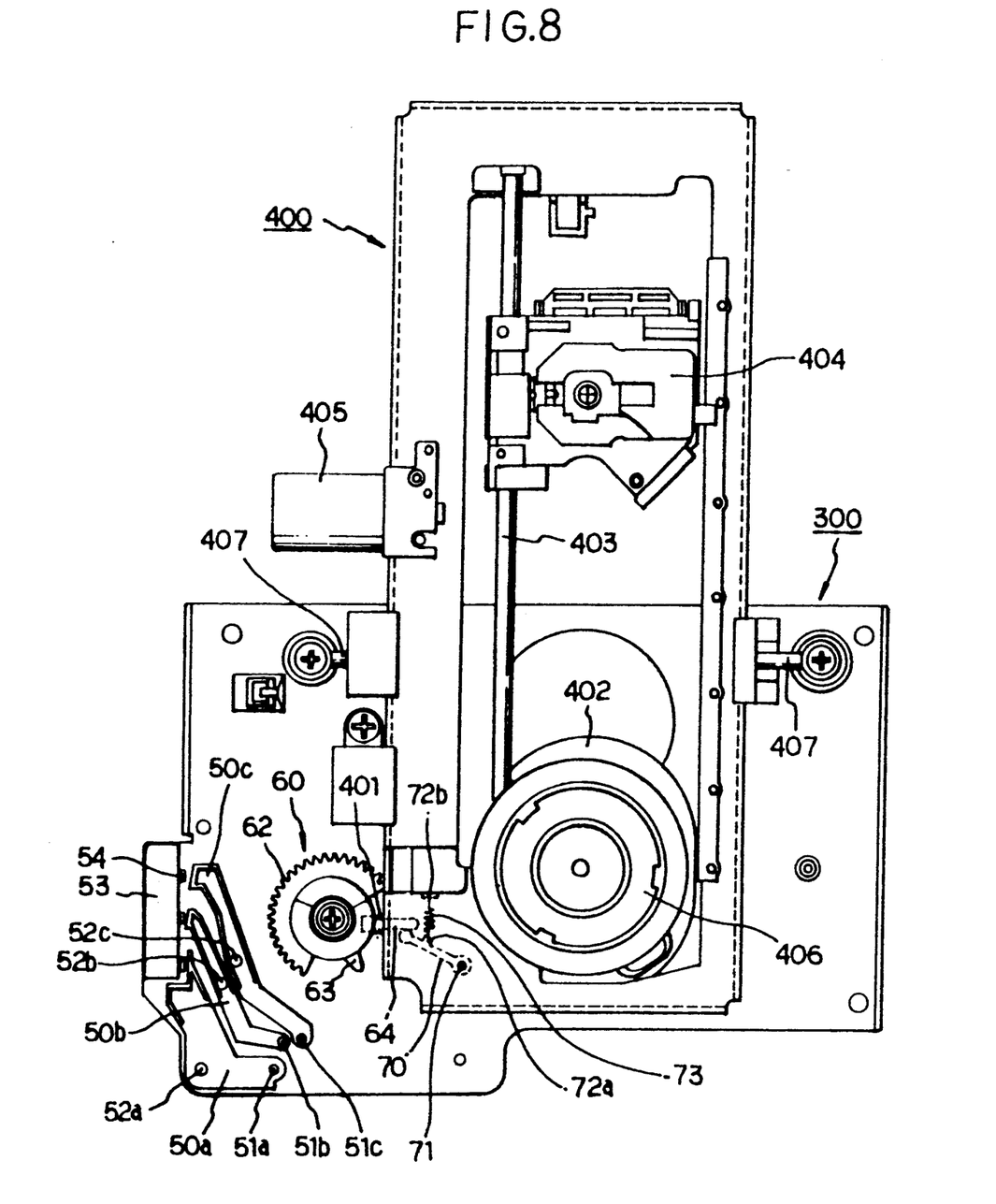
FIG. 8 is a top view of the laser disk player according to the present invention, representing an assembled state of a deck and an optical apparatus.

As shown in FIG. 8, guiding pins 51a, 51b, and 51c formed at switching levers 50a, 50b, and 50c are inserted into the first, second, and third cam slots 33a, 33b, and 33c, respectively. At the center parts of the switching lever 50a, 50b, and 50c, fixing pins 52a, 52b, and 52c are respectively formed, so that they are freely moved on the deck 300. The other ends of the switching levers 50a, 50b, and 50c are in contact with the buttons 54 of the mode switch 53 mounted on the deck 300, performing an ON/OFF operation.

Figure 12A:
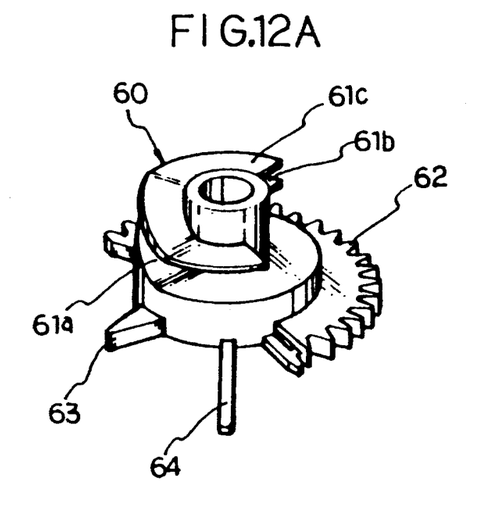
FIGS. 12A and 12B show perspective and cross-sectional views, respectively, of a tilt gear of the laser disk of the present invention.
Figure 12B:
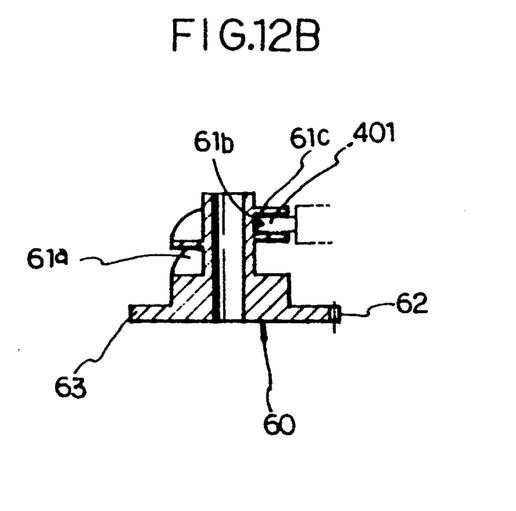

As shown in FIGS. 12A and 12B, a tilt gear 60 on which tilting slots 61a, 61b, and 61c are connected to each other in a spiral form and under which a gear part 62 is formed at the exterior border of the lower part of the tilting gear, is engaged with the third gear part 37 of the rotary member 30. A supporting piece 63 and a hanging piece 64 are formed between the gear part 62 of the tilt gear 60, where the supporting piece 63 is in contact with the exterior border of the rotary member 30, while the handing piece 64 is in contact with one end of a lever 70.

As shown in FIG. 8, the lever 70 is formed on the deck 300 so as to be pivoted around the fixing pin 71. A hanging piece 72a is formed at one end of the lever to fix one end of a spring 73 and the other end of the spring 73 is fixed to another hanging piece 72b on the deck 300, applying the resilient force to the tilt gear 60. An operating piece 401 formed at one side of the optical apparatus 400 is inserted into the first, second, and third tilting slots 61, 61b, and 61c of the tilt gear 60.

As shown in FIG. 8, a feeding motor 405 for driving the optical pickup 404 a guiding axis 403, is mounted on the optical apparatus 400. Also, a turn-table 406 is mounted on the spindle motor 402 for safely receiving the disk 201. In order to detect a distance between the disk 201 and the optical pickup 404, a sensor (not shown) is also provided at a predetermined position on the optical apparatus 400. This optical apparatus 400 is mounted at the deck 300 so as to be freely tilted around the fixing axis 407.

Now, the present invention is explained in detail in its sequence of steps for assembling major parts of the laser disk player.

The deck 300 provided with the optical apparatus 400 is mounted at the upper face of the lower frame 102 of the chassis 100, while the rotary member 30 is mounted at the boss 108a of the lower frame 102. The side plate 10 is mounted to the guiding slot 104 formed at the side frame 101 of the chassis 100.

Figure 5:
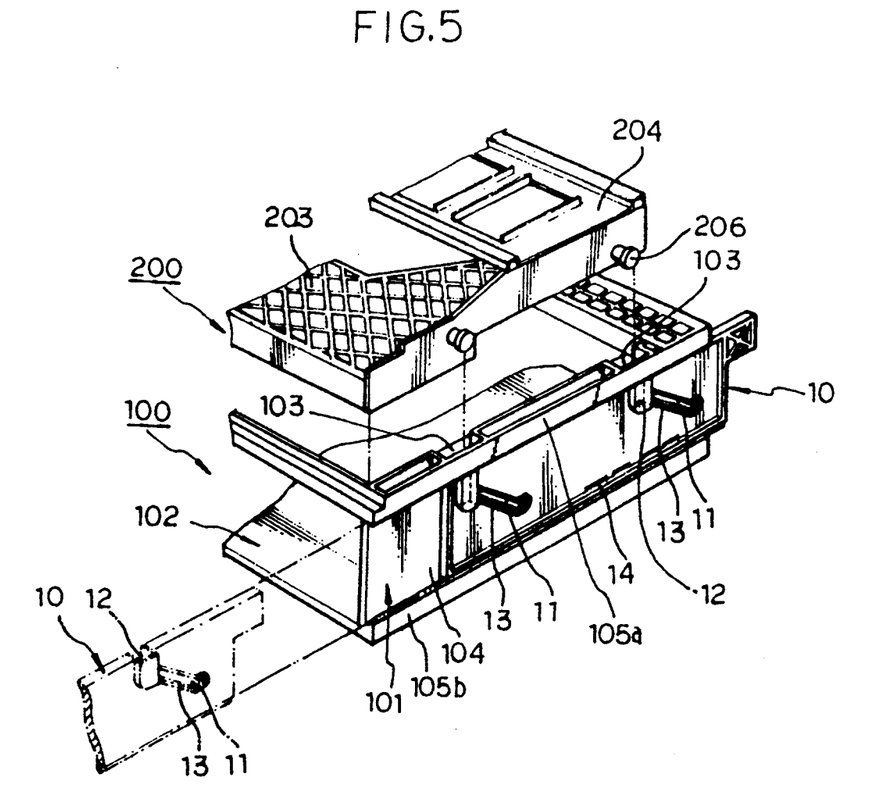
FIG. 5 is a partial perspective view of the laser disk player according to the present invention, representing an assembled state of a chucking apparatus.

At this time, as shown in FIG. 5, the assembling slot 12 connected to the guiding hole 11 of the side plate 10 must agree with the guiding slot 103 of the side frame 101. Also, when the rotary member 30 is mounted at the upper surface of the chassis 100, the rotary member 30 is joined with the boss 108a after the assembling holes 34a, 34b, and 34c formed in the first, second, and third cam slots 33a, 33b, and 33c of the rotary member 30 agree well with the guiding pins 51a, 51b, and 51c, respectively, of the respective switching levers 50a, 50b, and 50c formed on the deck 300. By such a method, the guiding pins 51a, 51b, and 51c of the respective switching levers 50a, 50b, and 50c, can accurately be inserted into the first, second, and third cam slots 33a, 33b, and 33c of the rotary member 30. After the locking face 23 of the first tray gear 20 is mounted at the boss 108b of the lower frame 102 so as to be in contact with the exterior border of the rotary member 30, the second gear part 22 of the first tray gear 20 is mounted and engaged with the second gear part 36 of the rotary member 30.

At this time, after the mark 21a formed at the upper face of the first gear part 21 of the first tray gear 20 is accurately positioned at the bending part 32a of a rib 32 formed at the upper face of the rotary member 30, the fixing pin 45a is assembled with the boss 108a of the lower frame 102.

Figure 6:
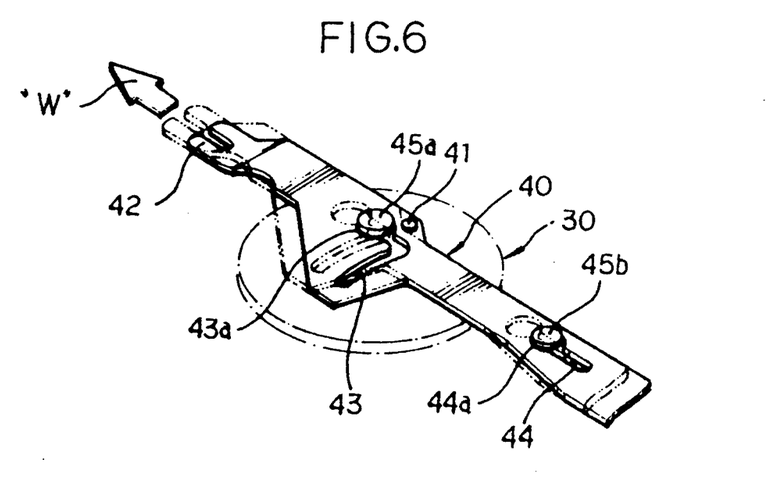
FIG. 6 is a partial perspective view of the laser disk player according to the present invention, representing an assembled state of a lever.

On the other hand, a sequence of steps for assembling the lever 40 to operate the side plate 10, is shown in FIG. 6.

After inserting the assembling holes 43a and 44a of the lever 40, the fixing pins of 45a and 45b of the lower frame 102 into respectively, the lever 40 is pulled in a direction of arrow "W" as shown in FIG. 6. Then, the fixing pins 45a and 45b are guided to the long slots 43 and 44 connected to the assembling holes 43a and 44a.

Since the guiding pin 41 of the lever 40 is positioned at the space part 12 ("A" in FIG. 10A) connected to the cam slot 31 of the rotary member 30, as shown in FIG. 10A, the lever can be moved easily, thereby making the assembling process easier. Each of the sliding parts 42 of the lever 40 is inserted into a linking hole 14 of the side plate 10.

After inserting the guiding axis 206 formed at the bracket tray 203 of the chucking apparatus 200 into both the guiding slot 103 formed at the side frame 101 of the chassis 100 and the guiding hole 11 formed at the side plate 10, the rotary power is applied to the pulley 16 from external through the space part 205 of the bracket tray 203. Then, the rotary member 30 is rotated by the gears 17a and 17b and the guiding pin 41 of the lever 40 is positioned at the starting point ("B" in FIG. 10A) of the cam slot 31 according to the rotation of the rotary member 30. Here, the lever 40 moves the side plate 10 on the guiding slot 104 of the side frame 101. Then, the guiding axis 206 of the bracket tray 203 is hung to the shaped guiding hole 11 of the side plate 10, so as not to break away from the guiding hole 103 of the side frame 101.

At this time, the state that the guiding pin 41 of the lever 40 is positioned at the starting point of the cam slot 31 formed at the rotary member 30 is the unloading state of the laser disk player such that the rotation of the rotary member 30 is limited or completed by the operation of the mode switch 53 according to the switch levers 51a, 50b, and 50c. Thus, the disassembling of the chucking apparatus 200 and the lever 40 is possible only when the guiding pin 41 is positioned at the empty part 31a of the cam slot 31 by applying the rotary power to the pulley 16, in contrary to the assembling process.

Figure 1:
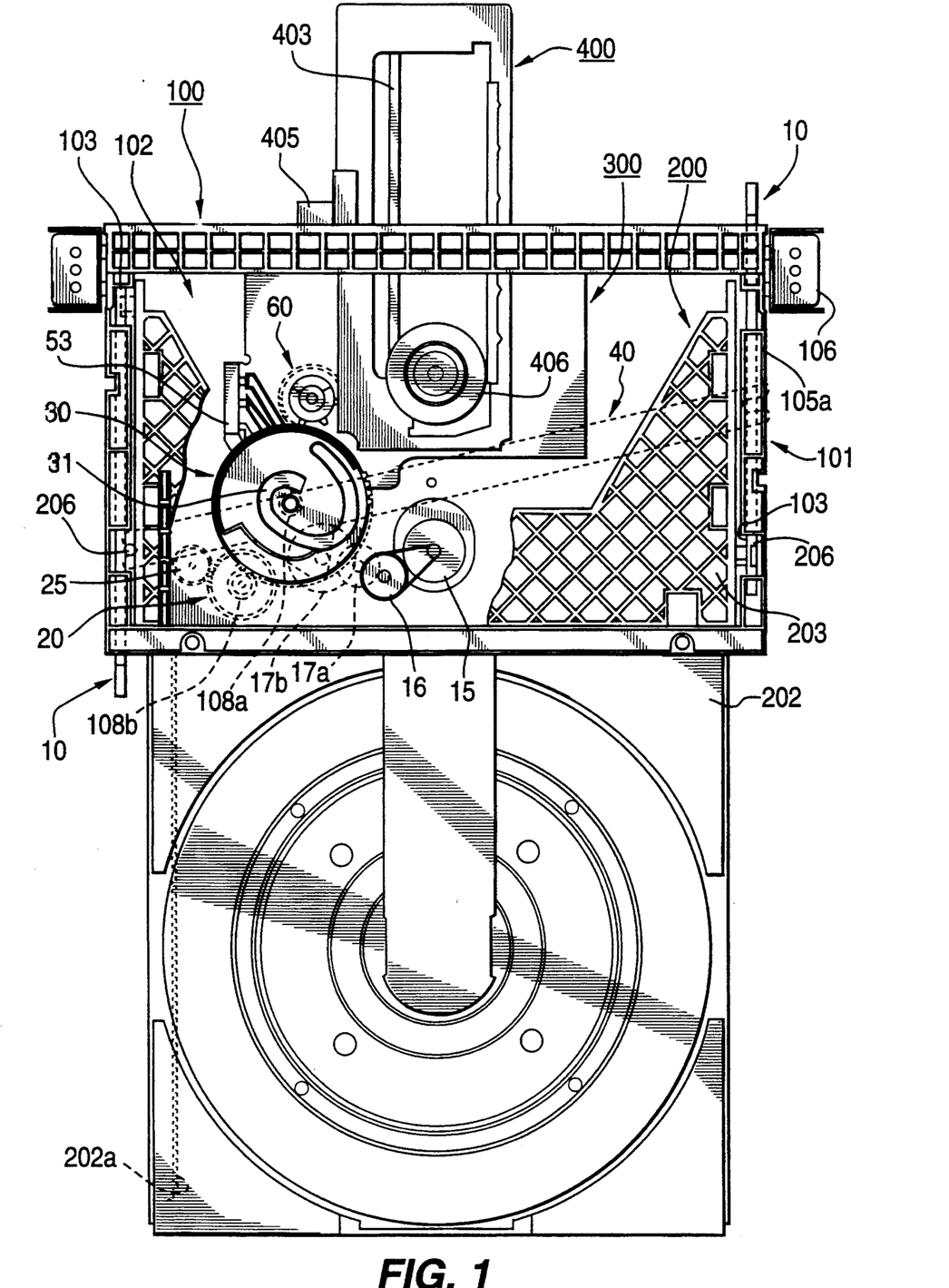
FIG. 1 is a partial top view of a laser disk player according to the present invention, representing a part of an unloading state.
Figure 2:
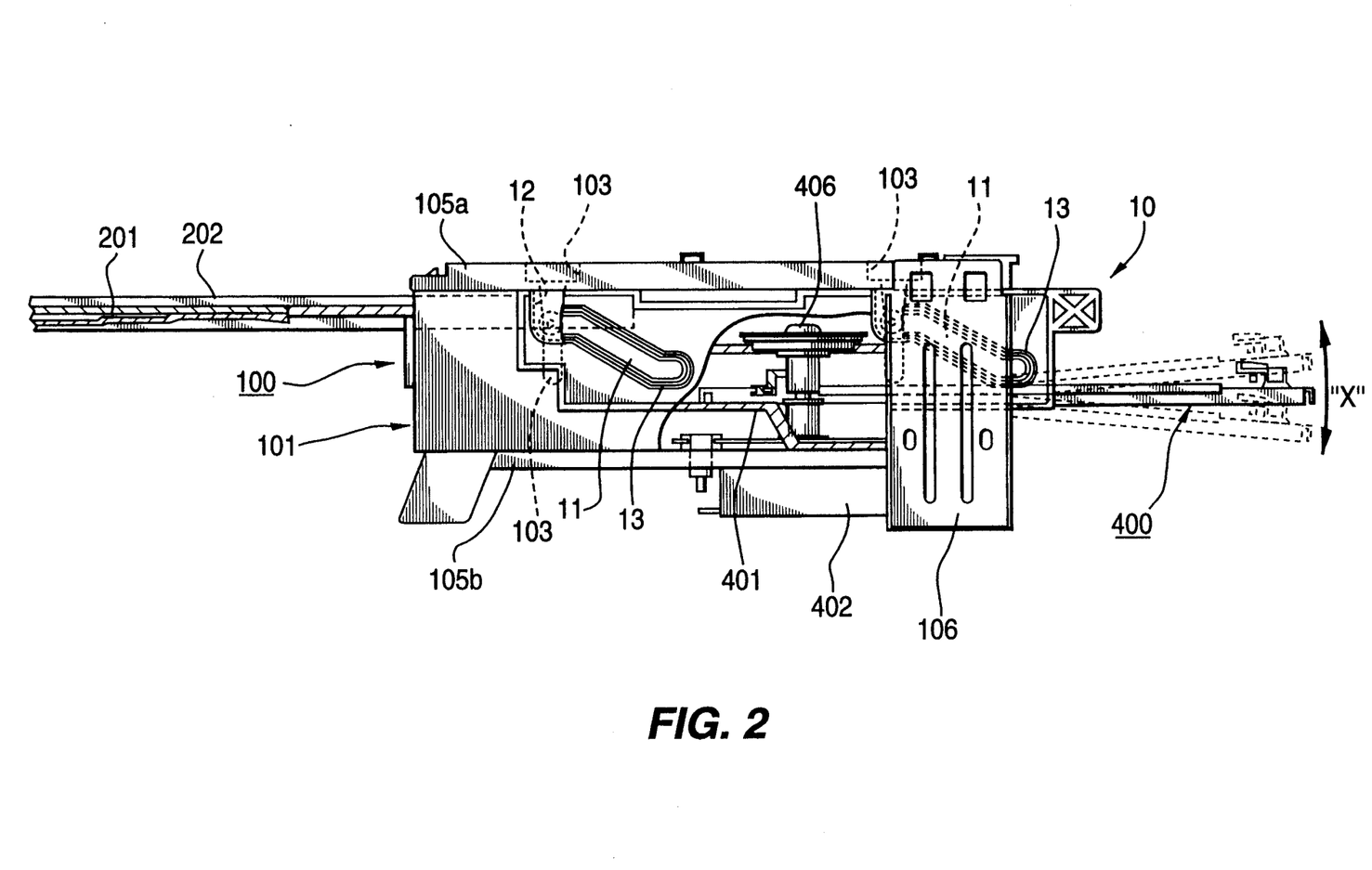
FIG. 2 is a sectional side view of the laser disk player according to the present invention.
Figure 3:
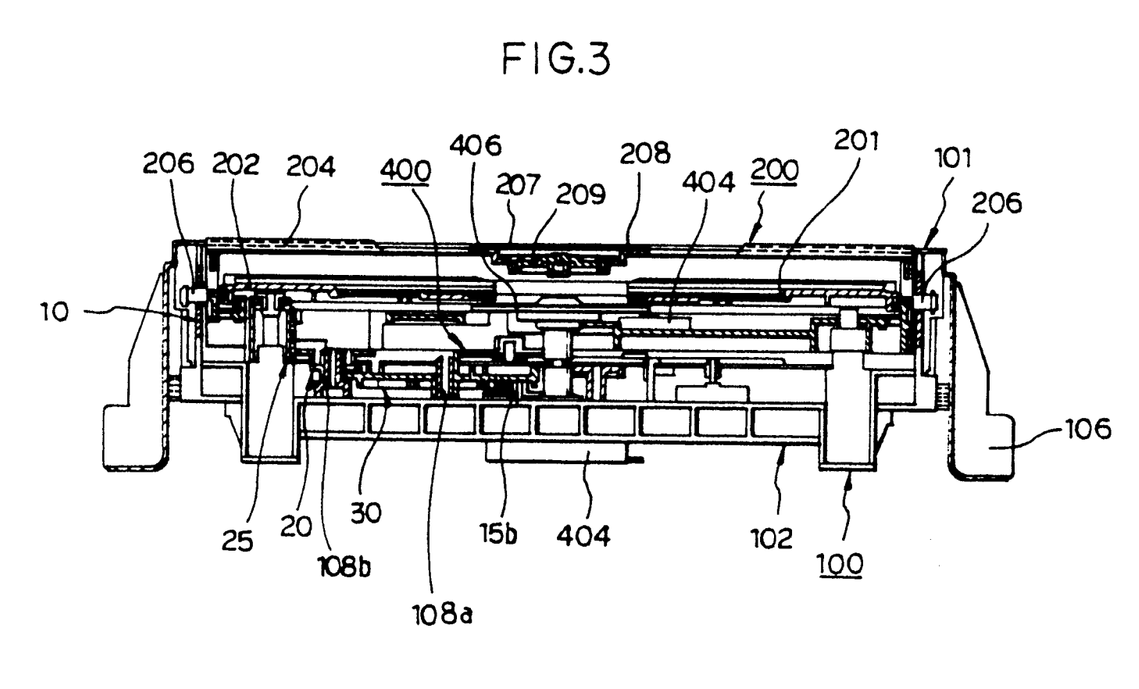
FIG. 3 is a partial cross-sectional view of the laser disk player according to the present invention.

Accordingly, each part of the laser disk player can easily be mounted to or separated from the chassis 100. Also, as shown in FIG. 1, if the disk tray is pushed due to the external mode switch or the external physical force after loading the disk 201 on the disk tray 202, the main motor 15 connected to a limit switch (not shown) is rotated, transferring the rotary power to the pulley 16 and the gears 17a and 17b. Then, the rotary member 30 is also rotated. At this time, the rotary power of the rotary member 30 is transferred to the first and second tray gears 20 and 25 and then the disk tray 202, of which the rack part 202a is engaged with gear part 26, is loaded by the transferred rotary power of the second tray gear 25. This loading operation is performed by the guiding pin 41 of the lever 41 in the loading section I formed at the rotary member 30.

Figure 4:
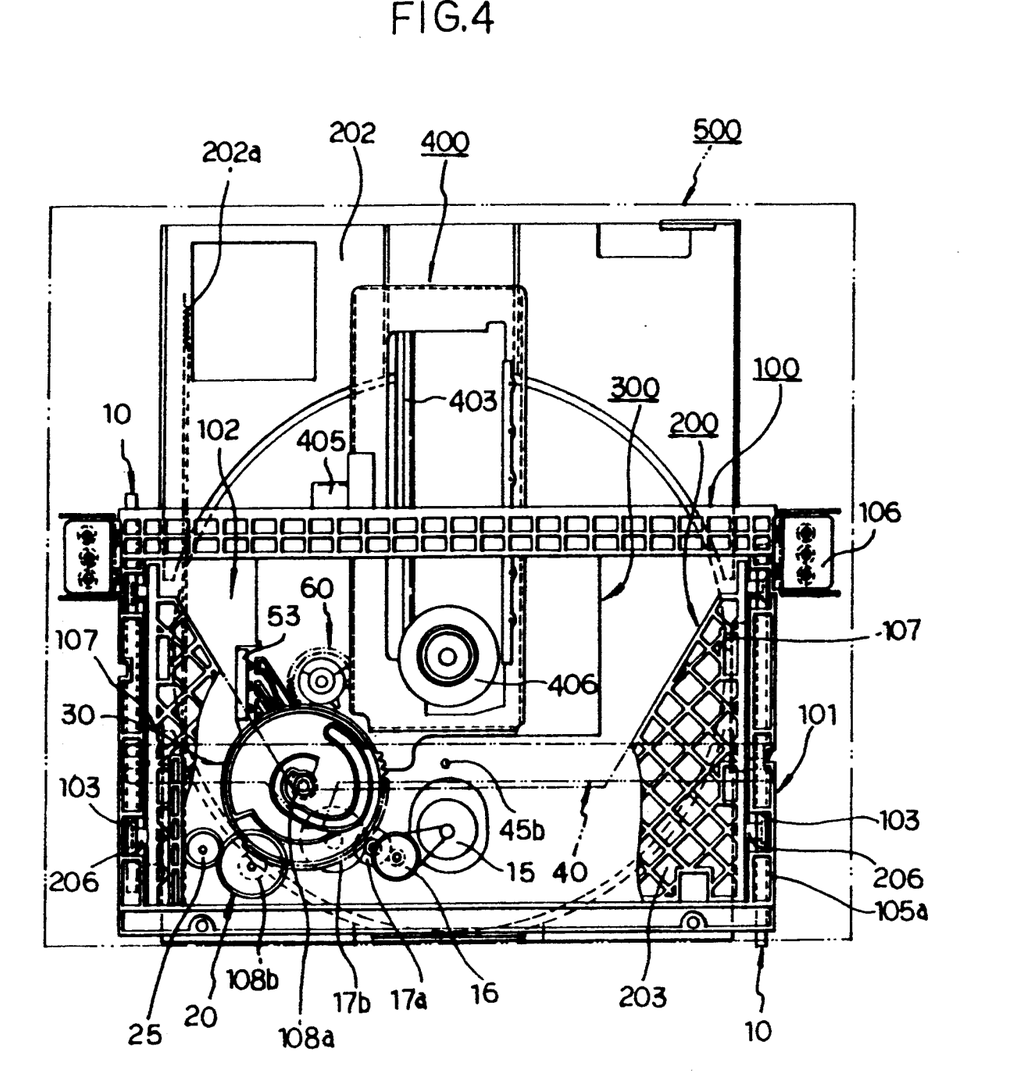
FIG. 4 is a partial top view of the laser disk player according to the present invention, representing a part of a loading state.

As shown in FIG. 4, by the continuous rotation of the rotary member 30, the guiding pin 41 of the lever 40 is guided to the chucking section II of the rotary member 30. Thus, the long slots 43 and 44 of the lever 40 are guided according to the fixing pins 45a and 45b, respectively, and the sliding part 42 of the lever 40 is guided according to the underpinning piece 107 formed at the lower frame 102 of the chassis 100, moving the side plate 10 in the guiding slot 104 of the side frame 101. The side plate 10 is guided by the guiding pieces 105a and 105b of the side frame 101. Also, the shaped guiding hole 11 of the side plate 10 guides the guiding axis 206 of the bracket tray 203 to the guiding slot 103 of the side frame 101 according to the guiding rib 13, moving the chucking apparatus 200 downward.

The gear part 26 of the second tray gear 25, mounted at the lower face of the bracket tray 203, is guided according to the first gear part 21 of the first tray gear 20 and the rack part 202a of the disk tray 202 is guided according to the first gear part 21 of the first tray gear 20 to the gear part 26 of the second tray gear 25, being moved downward. At this time, the second gear part 22 of the first tray gear 20 is disjointed from the second gear part 36 of the rotary member 30 and the locking face 23 is in contact with the outside of the rotary member 30.

Since the chucking apparatus 200 is moved downward, the clamp 209 presses on the upper face of the disk 201 to chuck the disk 20 on the turn-table of the spindle motor 402. Also, the clamp 209 prevents the slip of the disk 201 by the resilient force of the plate spring 207. The rotary member 30 guides the guiding pins 51a, 51b, and 51c of the switching levers 50a, 50b, and 50c inserted into the first, second, and third cam slots 33a, 33b, and 33c, according to each operation state. The switching levers 50a, 50b, and 50c are moved, centered on the fixing pins 52a, 52b, and 52c, respectively, according to the buttons 54 of the mode switch 53. Then, the buttons are turned on or off. Thus, an ON or OFF signal is transferred to the driving devices (not shown), stopping the main motor 15.

Subsequently, the spindle motor 402 of the optical apparatus 400 rotates the disk 201 and the feeding motor 405 moves the optical pickup 404 according to the guiding axis 403 to play back the information recorded in the disk. Here, the sensor of the optical apparatus 400 detects a distance between the disk 201 and the optical pickup 404 to rotate the electrically connected main motor 15. Then, the main motor 15 transfers the rotary power sequentially to the pulley 16 and the gears 17a and 17b, thereby rotating the rotary member 30.

According to the rotation of the rotary member 30, the supporting piece 63 is in contact with the outside of the rotary member 30 and the gear part 62 of the tilt gear 60 is engaged with the third gear part 37 of the rotary member 30 by the moving force of the lever 70. That is, the lever 70 tends to move by the elastic force of the third gear part 37, centered on the fixing pin 71, and this force is transferred to the tilt gear 60 through the handing piece 64. Thus, the guiding pin 41 of the lever 40 is guided within the tilting section III of the cam slot 31 formed at the rotary member 30 and the tilt gear 60 is rotated by the rotary member 30, guiding the operating piece 401 of the optical apparatus 400 on the first, second, and third tilting slots 61a, 61b, and 61c. Then, the optical apparatus 400 is tilted along the direction of the tilt gear 60 (direction "X" in FIG. 2) and thus the distance between the disk 201 and the optical pickup 404 is kept constant.

On the other hand, if any external mode is selected to convert the mode during the playback of the information in the disk 201, the main motor 15 is rotated by the driving device, rotating the rotary member 30. Then, the disk tray 202 is moved down by the rotary member 30 and returns to its original position to protect the disk 201.

In the case of picking out the disk 201 from the disk tray 202 after completing the playback of the disk 201, the ejecting mode is again selected to rotate the main motor in an opposite direction to the loading operation. Then, the rotary member 30 is rotated in a direction to the tilting and chucking operations and thus each part enters an unloading state.

As described hereinabove, the laser disk player according to the present invention sequentially performs the loading, chucking and tilting operation of the disk tray by using the main motor. Also, each part is easily mounted to or separated from a chassis, simplifying the manufacturing process. Accordingly, the productivity is improved and the manufacturing expense is decreased. Furthermore, the feature and size of the case can easily be varied, making a variety of products.

What is claimed is:

1. A laser disk player for playing back information recorded in a disk by using an optical pickup, comprising:

chucking means mounted on a chassis and having a bracket tray, for performing a loading and a chucking operation of a disk tray;

a plate located at said bracket tray of said chucking means;

a plate spring fixed at the center of said plate by a holder;

a clamp mounted at said holder to press on a surface of the disk;

rotary means having first and second surfaces and receiving rotary power from a main motor, for sliding said disk tray by rotation of a first tray gear and a second tray gear engaged with said rotary means;

a lever operated according to the motion of said rotary means for chucking a disk by guiding said bracket tray of said chucking means using a side plate connected to said chassis; and a tilt gear mounted on a deck and engaged with said rotary means, for tilting an optical apparatus holding the optical pickup;

said rotary means further comprising:

a cam slot formed on said first surface, for moving a guiding pin formed on said lever to control operation of said laser disk player, said cam slot having a widened portion for accommodating insertion of said guiding pin during assembly of said laser disk player;

said second surface of said rotary means having a plurality of mode cam slots, each mode cam slot having a corresponding engaging pin movably installed within each said mode cam slot for controlling modes of operation of said optical pickup; and each mode cam slot further comprising an assembly hole for accommodating each corresponding engaging pin during assembly of said laser disk player.

2. The laser disk player according to claim 1, further comprising:

a guiding slot having one open end formed at a side frame of said chassis;

a side plate with a guiding hole mounted at said guiding slot of the side frame;

an assembling slot formed at one end of said guiding hole of said side plate; and a guiding axis of said bracket tray guided along said assembling slot to be assembled with said guiding hole of said chassis and said side plate.

3. The laser disk player according to claim 2, wherein said bracket tray is mounted at said side frame of said chassis to be assembled with a case.

4. The laser disk player according to claim 2, further comprising:

a guiding rib formed at an exterior border of said guiding hole of said side plate.

5. The laser disk player according to claim 2, wherein said cam slot is formed on said first surface of said rotary means to differentiate a moving section and a chucking section of the disk tray and a tilting section of the optical apparatus.

6. The laser disk player according to claim 1, further comprising:

a space formed at a center portion of said bracket tray to accommodate a pulley during assembly of said laser disk player.

7. The laser disk player according to claim 1, further comprising:

a first gear part and a second gear part formed at an exterior border of an upper and a lower face of said first tray gear, respectively; and a boss having a locking face of three step facets formed between said first and second gear parts, said locking face for contacting and controlling rotation of said rotary means.

8. The laser disk player according to claim 7, further comprising:

a mark formed at said upper face of said first gear part of said first tray gear, spaced apart by a predetermined angle created between a first axis running through said mark and a center of said upper face and a second axis running through said center and along said upper face.

9. The laser disk player according to claim 1, wherein said cam slot is formed on said first surface of said rotary means and provides a transition between said sliding operation of the disk tray, said chucking operation of the disk tray, and said tilting operation of the optical apparatus.

10. The laser disk player according to claim 9, wherein a first rotary gear part is formed at an exterior border of one of said plurality of mode cam slots in said rotary means, and a second and a third rotary gear part are formed at an exterior border of said rotary means.

11. The laser disk player according to claim 9, wherein a rib having a bending part at a predetermined position spaced apart by a predetermined angle is created between a first axis running through a mark and a center of said first surface and a second axis running through said center and along said first surface formed at an exterior border of said cam slot in said rotary means.

12. The laser disk player according to claim 9, further comprising:

each said assembly hole being formed on said second surface of said rotary means so that engaging pins of switching levers are inserted within each said assembly hole to facilitate assembly of said optical disk player.

13. The laser disk player according to claim 12, wherein a fixing pin is formed at a center portion of each said switching lever so that each said switching lever is freely rotatable on said deck, each said switching lever being in contact with a button of a mode switch to perform an ON/OFF operation.

14. The laser disk player according to claim 1, further comprising:

sliding parts with a predetermined tilt angle, said sliding parts being formed at both ends of said lever, and assembling holes connected with long slots formed at predetermined positions of said lever so that said assembling holes can easily be assembled with and separated from fixing pins.

15. The laser disk player according to claim 1, further comprising:

first, second, and third tilting slots formed in a spiral form at an upper side of said tilt gear; and a gear part formed at an exterior border of a lower face of said tilt gear.

16. The laser disk player according to claim 15, further comprising:

a supporting piece formed at said exterior border of said lower face of said tilt gear and in contact with an exterior border of said rotary means;

lever means for biasing said tilt gear toward a first orientation; and a hanging piece connected to one end of said biasing lever means.

17. The laser disk player according to claim 16, wherein said biasing lever is formed on said deck and rotated about a fixing pin and one end of a spring is fixed to a protrusion formed at one end of said biasing lever.

18. An optical disk player using an optical pickup for reproducing data from an optical disk rotated on a turntable, said optical disk player comprising:

a chassis;

chucking means having a disk tray receiving the optical disk and a bracket tray and supported by said chassis, for transporting the optical disk from an unloaded position outside said chassis to a second position within said chassis, and for chucking the optical disk to the turntable;

an optical apparatus having an operating piece and holding the optical pickup, said optical apparatus capable of rotating about a fixing axis above said chassis;

switch means for controlling modes of operation of said optical pickup;

a plurality of mode levers connected to said switch means, each one of said mode levers having an engaging pin;

a tilt gear having a plurality of tilting slots spirally formed about an axis of rotation of said tilt gear, said tilting slots engaging said operating piece of said optical apparatus to tilt said optical apparatus about said fixing axis during rotation of said tilt gear;

lever means having a guiding pin, for moving said chucking means downward to chuck the optical disc to the turntable;

a rotary member having first and second surfaces, said first surface having a cam slot with three operational sections and with said guiding pin engaged in said cam slot, said rotary member causing said chucking means to transport the optical disk from said unloaded position to said loaded position while said guiding pin is in a first of said three operational sections, said lever means to move said chucking means downward while said guiding pin is in a second of said three operational sections, and said tilt gear to rotate in order to tilt said optical apparatus about said fixing axis while said guiding pin is in a third of said three operational sections; and drive means including a motor, for transferring rotary power to said rotary member;

said rotary member further comprising:

said cam slot having a widened portion next to said first operational section for accommodating said guiding pin during assembly of said optical disk player;

said second surface of said rotary member having a plurality of mode cam slots formed adjacent to one another with each said engaging pin of each one of said mode levers being moveable within a separate one of said plurality of mode cam slots for controlling modes of operation of said optical pickup by selectively activating said switching means; and each of said plurality of mode cam slots having an assembly hole formed within an interior of each of said plurality of mode cam slots for accommodating each said engaging pin of each one of said mode levers during assembly of said optical disk player.

19. The disk player as claimed in claim 18, wherein said chassis comprises:

a pair of side walls spaced-apart and positioned opposite from each other;

a lower wall;

four guiding pieces, two guiding pieces of said four guiding pieces being located on opposite sides of each of said pair of side walls, and respectively creating a slot formed between said two guiding pieces; and a plurality of bar-type guiding slots formed in each one of said four guide pieces;

a pair of side plates, each one of said pair of side plates movable in the slot formed between said two guiding pieces having a linking hole containing an end of said lever means, a plurality of assembly slots, each one of said assembly slots being aligned with a corresponding one of said plurality of bar-type guiding slots and running in a downward direction, and a plurality of shaped guide holes formed in each one of said side plates, each one of said shaped guide holes extending from an end of a corresponding assembly slot at a predetermined angle from said downward direction; and said assembly slots and shaped guide holes guide movement of protrusions extending from said chucking means.

20. The optical disk player as claimed in claim 19, wherein: said rotary member further comprises:

a rib extending from said cam slot on said first surface to an outer periphery of said rotary member, said rib having a bending part which extends radially outward from a center of said rotary member;

a first gear part formed on a portion of an outer periphery of an outermost mode cam slot;

a second gear part formed on a portion of said outer periphery of said rotary member; and a third gear part formed on a portion a periphery of said second surface closer to said center of said rotary member than said second gear part.

21. The optical disk player as claimed in claim 20, wherein said lever means comprises:

first and second ends which are inserted into said each of said linking holes, respectively;

a first restraining slot running parallel to a length of said lever means;

a second restraining slot running perpendicular to a length of said lever means;

two fixing pins movable within said two restraining slots and coupled to said chassis;

wherein lever means moves said side plates in said slots between said guiding pieces in order for movement of said shaped guide holes to move said bracket tray downward.

22. The optical disk player as claimed in claim 19, wherein said lever means comprises:

first and second ends which are inserted into said each of said linking holes, respectively;

a first restraining slot running parallel to a length of said lever means;

a second restraining slot running perpendicular to a length of said lever means;

two fixing pins movable within said two restraining slots and coupled to said chassis;

wherein lever means moves said side plates in said slots between said guiding pieces in order for movement of said shaped guide holes to move said bracket tray downward.

23. The optical disk player as claimed in claim 18, wherein said chucking means comprises:

said disk tray mounted to said bracket tray;

a top plate assembled on said bracket tray;

protrusions extending from sides of said bracket tray which travel within shaped guide holes formed in said chassis; and pressure means having a spring and connected to said top plate, for pressing on the optical disk;

said bracket tray having an opening through which rotary power is applied to said drive means during assembly of said optical pickup.

24. The optical disk player as claimed in claim 23, further comprising:

a pulley linked to said motor and said rotary member, for receiving rotary power from an external source during assembly of the optical disk player to rotate said rotary member and position said guiding pin in said cam slot.

25. The optical disk player as claimed in claim 18, wherein: said rotary member further comprises:

a rib extending from said cam slot on said first surface to an outer periphery of said rotary member, said rib having a bending part which extends radially outward from a center of said rotary member;

a first gear part formed on a portion of an outer periphery of an outermost mode cam slot;

a second gear part formed on a portion of said outer periphery of said rotary member; and a third gear part formed on a portion a periphery of said second surface closer to said center of said rotary member than said second gear part.

26. The optical disk player as claimed in claim 25, wherein said chucking means comprises:

a first tray gear having a first tray gear part formed on a portion of an outer periphery of said first tray gear, a second gear part formed on a diameter of a first surface of said first tray gear closer to a center of said first tray gear than said first tray part and engaging said second gear part of said rotary member, a mark formed on a second surface of said first tray gear to be positioned at said bending part of said rotary member;

a second tray gear engaging said first tray gear part of said first tray gear;

a rack gear formed on disk tray engaging said second tray gear, to linearly move said disk tray.

27. The optical disk player as claimed in claim 26, wherein said first tray gear further comprises:

a boss part formed between said first and second surface of said first tray gear on which said mark is formed.

28. The optical disk player as claimed in claim 26, wherein:

said tilting gear comprises:

a tilt gear part formed on a portion of an outer periphery of said tilt gear, said tilt gear part engaging said third gear part of said rotary member when said guiding pin is in said third operational section; and a hanging piece formed on said outer periphery not having said tilt gear part; and said optical disk player further comprises:

biasing means for biasing said tilt gear in a given rotational direction by applying a force to said hanging piece.

29. The optical disk player as claimed in claim 26, wherein:

said first tray gear is mounted on said chassis; and said second tray gear is mounted on said chucking means below said bracket tray.

30. The optical disk player as claimed in claim 25, wherein:

said tilting gear comprises:

a tilt gear part formed on a portion of an outer periphery of said tilt gear, said tilt gear part engaging said third gear part of said rotary member when said guiding pin is in said third operational section; and a hanging piece formed on said outer periphery not having said tilt gear part; and said optical disk player further comprises:

biasing means for biasing said tilt gear in a given rotational direction by applying a force to said hanging piece.

31. The optical disk player as claimed in claim 25, further comprising:

a deck mounted on said chassis, said optical apparatus and said tilt gear being mounted on said deck.

32. The optical disk player as claimed in claim 18, wherein:

said tilting gear comprises:

a tilt gear part formed on a portion of an outer periphery of said tilt gear, said tilt gear part engaging said rotary member when said guiding pin is in said third operational section; and a hanging piece formed on said outer periphery not having said tilt gear part; and said optical disk player further comprises:

biasing means for biasing said tilt gear in a given rotational direction by applying a force to said hanging piece.

33. The optical disk player as claimed in claim 32, wherein said biasing means comprises:
   a lever arm fixed to said chassis at a first end having a receiving protrusion; and
   a spring attached at one end to said receiving protrusion.

34. The optical disk player as claimed in claim 33, wherein said tilt gear further comprises:
   a supporting protrusion formed on said outer periphery of said tilt gear between said hanging piece and said tilt gear part and in contact with said outer periphery of said rotary member.

35. The optical disk player as claimed in claim 18, further comprising:
   a deck mounted on said chassis, said optical apparatus being mounted on said deck.

36. An optical disk player for reproducing data from an optical disk rotated on a turntable by using an optical pickup, said optical disk player comprising:
   a chassis having shaped guide slots formed in opposite sides of said chassis, said shaped guide slots running at a predetermined angle from a direction of an axis of rotation of the optical disk;
   chucking means having protrusions extending from opposite sides of said chucking means inserted in said shaped guide slots, for linearly sliding the optical disk from an unloaded position outside said chassis to a loaded position within said chassis, and for chucking the optical disk on the turntable;
   an optical apparatus having an operating piece and capable of being tilted in a first and a second rotational direction about an axis elevated from said chassis;
   a tilting gear having a plurality of tilting slots spirally formed about an axis of rotation of said tilting gear, said tilting gear engaging said operating piece of said optical apparatus;
   lever means having a guide pin, for causing said chassis to move said chucking means in said direction of an axis of rotation of the optical disk;
   a rotary member having first and second surfaces and mounted on said chassis, for alternately causing said chucking means to linearly slide the optical disk from said unloaded position to said loaded position, said lever means to induce said chassis to move said chucking means in said direction of the axis of rotation of the optical disk, and rotating said tilting gear to tilt said optical apparatus, in dependence upon operating modes of said optical disk player; and
   drive means including a motor, for transferring rotary power to said rotary member;
   said rotary member further comprising:
      a cam slot with three operational sections formed on said first surface for engaging said guide pin, said cam slot having a widened portion for accommodating said guide pin during assembly of said optical disk player;
      said second surface of said rotary member having a plurality of mode cam slots, each mode cam slot having a corresponding engaging pin movably installed within each mode cam slot for directing a mode lever to control modes of operation of said optical pickup; and
      each mode cam slot further comprising assembly hole for accommodating each corresponding engaging pin during assembly of said optical disk player.

37. The optical disk player as claimed in claim 36, wherein said chassis comprises:
   a pair of side walls spaced-apart and positioned opposite from each other;
   a lower wall;
   four guiding pieces, two guiding pieces of said four guiding pieces being located on opposite sides of each of said pair of side walls, and respectively creating a slot formed between said two guiding pieces; and
   a plurality of bar-type guiding slots formed in each one of said four guide pieces;
   a pair of side plates, each one of said pair of side plates movable in the slot formed between said two guiding pieces having a linking hole containing an end of said lever means, a plurality of assembly slots, each one of said assembly slots aligned with a corresponding one of said plurality of bar-type guiding slots and running in a downward direction, and a plurality of shaped guide holes formed in each one of said side plates, each one of said shaped guide holes extending from an end of a corresponding assembly slot at a predetermined angle from said downward direction; and
   said assembly slots and shaped guide holes guide movement of said protrusions of said chucking means and said rotary member moving said guiding pin to cause said lever means to move said pair of side plates during one of said operating modes of the optical disk player, thereby moving said chucking means in said downward direction.

38. A method of operation of an optical disk player reproducing data from an optical disk rotated by a turntable, said method comprising:
   engaging a first gear part of a rotary member with a gear part of a loading member supported by a chassis, said loading member carrying the optical disk to load the optical disk from outside said chassis of the optical disk player to within the optical disk player during a first mode of operation of the optical disk player;
   sliding a lever arm attached to a cam slot formed on a first side of a rotary member to move a pair of side plates of said chassis, thereby moving said loading member downward and chucking the optical disk on the turntable, during a second mode of operation of the optical disk player; and
   engaging a second gear part of said rotary member with a gear part of a tilting gear having a plurality of spiral slots to rotate said tilting gear, thereby rotating an optical apparatus holding an optical pickup about a fixed axis, during a third mode of operation of the optical disk player;
   said step of engaging said second gear part further comprising:
      biasing said tilting gear in a first rotational direction by connecting a biasing means to a hanging protrusion formed on a periphery of said tilting gear;
      rotating said tilting gear by said engagement of said second gear part of said rotary member with said gear part of said tilting gear;
      moving an operating piece connected to said optical apparatus into one of said plurality of spiral slots of said tilting gear according to said rotation of said tilting gear; and alternately moving said optical pickup held by said optical apparatus closer and more distant from the optical disk according to said movement of said operating piece.

39. The method as claimed in claim 38, further comprising:

changing said modes of operation by pressing mode buttons and moving a plurality of mode levers attached to mode cam slots formed on a second side of said rotary member in dependence upon said pressing of said mode buttons.

40. The method as claimed in claim 38, wherein said step of sliding a lever arm comprises:

sliding said lever arm in a given section of said cam slot;

moving said side plates in chassis guide slots formed in said chassis;

moving loading means guide slots formed in said side plates at a predetermined angle to said downward direction; and allowing movement of protrusions formed from sides of said loading means to move within said side plates based upon said movement of said loading means guide slots, thereby moving said loading means in said downward direction.

41. The method as claimed in claim 38, wherein said step of sliding a lever arm comprises:

sliding said lever arm in a given section of said cam slot;

moving said side plates in chassis guide slots formed in said chassis;

moving loading means guide slots formed in said side plates at a predetermined angle to said downward direction; and allowing movement of protrusions formed from sides of said loading means to move within said side plates based upon said movement of said loading means guide slots, thereby moving said loading means in said downward direction.

42. A method of assembling an optical disk player which reproduces data stored in an optical disk rotated by a turntable by using an optical pickup, said method comprising:

mounting a deck provided with an optical apparatus holding the optical pickup to a bottom of a chassis;

mounting a rotary member at first attachment means of said bottom;

mounting a pair of side plates to a respective pair of guide slots formed at respective side frames of said chassis;

joining said rotary member with said first attachment means after assembling holes formed in a plurality of mode cam slots formed on a first side of said rotary member agree with a corresponding plurality of guiding pins connected to a corresponding plurality of mode switching levers;

mounting and engaging a gear part of a first tray gear with a gear part of said rotary member after a locking face of said first tray gear is mounted at second attachment means of said bottom to be in contact with an outer periphery of said rotary member; and assembling a first fixing pin with said first attachment means of said bottom and assembling a second fixing pin with said bottom after a mark formed on a surface of said first gear part is positioned at a bending part of a rib formed on a second side of said rotary member.

43. The method as claimed in claim 42, further comprising:

inserting said first and second fixing pins into respective assembling holes of a lever;

pulling said lever in a given direction, thereby guiding said first and second fixing pins to respective long slots having lengths greater than diameters of said first and second fixing pins, respectively; and inserting each end of said lever into a respective linking hole formed in each one of said pair of side plates.

44. The method as claimed in claim 42, further comprising:

inserting protrusions formed at a bracket tray of a chucking apparatus into guide slots formed at said side frames of said chassis and further inserting said protrusions into shaped guiding holes formed in said side plates;

applying rotary power to a pulley from an external source through an opening in said bracket tray;

rotating said rotary member by gears connected to said pulley and a lever pin attached to said lever, said lever pin positioned at an end of a rotary cam slot formed on a second side of said rotary member; and moving said side plates on side frame guide slots, and then hanging said protrusions onto said shaped guiding holes of said side plates, so as not to break away from said guide slots formed at said side frames.

45. An apparatus, comprising an optical disk player assembled by the method of claim 42.

46. An apparatus, comprising an optical disk player assembled by the method of claim 42, and further comprising:

chucking means having a disk tray receiving the optical disk and a bracket tray and supported by said chassis, for transporting the optical disk from an unloaded position outside said chassis to a loaded position within said chassis, and for chucking the optical disk to the turntable;

an optical apparatus having an operating piece and holding the optical pickup, said optical apparatus capable of rotating about a fixing axis above said chassis;

a tilt gear having a tilting slot spirally formed about an axis of rotation of said tilt gear, said tilting slot engaging said operating piece of said optical apparatus to tilt said optical apparatus about said fixing axis during rotation of said tilt gear;

lever means having a guiding pin, for moving said chucking means downward to chuck the optical disc to the turntable;

said rotary member for causing said chucking means to transport the optical disk from said unloaded position to said loaded position while an engaging pin is in a first of three operational sections, said lever means moving said chucking means downward while said engaging pin is in a second of said three operational sections, and said tilt gear to rotate in order to tilt said optical apparatus about said fixing axis while said guiding pin is in a third of said three operational sections; and drive means including a motor, for transferring rotary power to said rotary member.

* * * * *